(12) United States Patent
Nakai

(10) Patent No.: US 10,532,706 B2
(45) Date of Patent: Jan. 14, 2020

(54) CONDUCTIVE WIRE AND WIRE HARNESS

(71) Applicant: Sumitomo Wiring Systems, Ltd., Yokkaichi, Mie (JP)

(72) Inventor: Hirokazu Nakai, Yokkaichi (JP)

(73) Assignee: Sumitomo Wiring Systems, Ltd., Yokkaichi, Mie (JP)

(*) Notice: Subject to any disclaimer, the term of this patent is extended or adjusted under 35 U.S.C. 154(b) by 0 days.

(21) Appl. No.: 16/000,970

(22) Filed: Jun. 6, 2018

(65) Prior Publication Data
US 2019/0023199 A1    Jan. 24, 2019

(51) Int. Cl.
*B60R 16/02* (2006.01)
*H01B 7/04* (2006.01)
*H02M 7/00* (2006.01)

(52) U.S. Cl.
CPC .......... *B60R 16/0207* (2013.01); *H01B 7/04* (2013.01); *H02M 7/003* (2013.01); *B60L 2210/40* (2013.01)

(58) Field of Classification Search
CPC ....... B60R 16/0207; H02M 7/003; H01B 7/04
USPC ...................................... 174/72 A
See application file for complete search history.

(56) References Cited

U.S. PATENT DOCUMENTS

| 2006/0278423 A1* | 12/2006 | Ichikawa | B60R 16/0215 174/72 A |
| 2008/0035800 A1* | 2/2008 | Yamamoto | F16L 3/015 248/70 |
| 2016/0148720 A1* | 5/2016 | Kanagawa | H01R 4/726 174/115 |

* cited by examiner

*Primary Examiner* — Timothy J Thompson
*Assistant Examiner* — Charles Pizzuto
(74) *Attorney, Agent, or Firm* — Honigman LLP

(57) ABSTRACT

An object of the description is to provide a conductive wire with a small diameter. A conductive wire configured to be arranged in a vehicle and electrically connect electrical devices includes: a rigid wire having a first core wire, and a first insulating coating that covers an outer circumference of the first core wire; and a flexible wire having a second core wire that is superior to the first core wire in terms of flexibility and is connected to an end of the first core wire, and a second insulating coating that covers an outer circumference of the second core wire. A wall thickness T1 in a radial direction of the first insulating coating of the rigid wire is smaller than a wall thickness T2 in a radial direction of the second insulating coating of the flexible wire.

5 Claims, 2 Drawing Sheets

CONDUCTIVE WIRE AND WIRE HARNESS

CROSS-REFERENCE TO RELATED APPLICATIONS

This application claims priority of Japanese Patent Application No. JP 2017-141740 filed Jul. 21, 2017.

FIELD OF THE INVENTION

The present description relates to a conductive wire used for wire harnesses for vehicles and the like.

BACKGROUND OF THE INVENTION

Conventionally, wire harnesses for vehicles such as hybrid cars or electric vehicles include conductive wires for electrically connecting electrical devices such as a battery and an inverter, for example, as shown in Japanese Patent No. 6048859. The conductive wire disclosed in Japanese Patent No. 6048859 includes a rigid wire ("single-core wire" in Japanese Patent No. 6048859) obtained by enclosing a single conductive material with a coating, and a flexible wire obtained by enclosing a flexible conductive material such as a twisted wire with a coating.

SUMMARY OF THE INVENTION

The diameter of such conductive wires needs to be reduced in order to improve the mountability on vehicles and the like.

The present description has been made in order to solve the above-described problem, and it is an object thereof to provide a conductive wire and a wire harness with a small diameter.

A conductive wire that solves the above-described problem is a conductive wire configured to be arranged in a vehicle and electrically connect electrical devices, including: a rigid wire having a first core wire, and a first insulating coating that covers an outer circumference of the first core wire; and a flexible wire having a second core wire that is superior to the first core wire in terms of flexibility and is connected to an end of the first core wire, and a second insulating coating that covers an outer circumference of the second core wire, wherein a wall thickness in a radial direction of the first insulating coating is smaller than a wall thickness in a radial direction of the second insulating coating.

With this configuration, a wall thickness in a radial direction of the first insulating coating of the rigid wire is smaller than a wall thickness in a radial direction of the second insulating coating of the flexible wire, and thus the diameter of the rigid wire can be reduced.

In this conductive wire, the first core wire is a single-core wire. With this configuration, the first core wire of the rigid wire is a single-core wire, and thus the diameter of the rigid wire can be further reduced.

A wire harness that solves the above-described problem is a wire harness including: the above-described conductive wire; and a tubular external cover member that covers an outer circumference of the rigid wire of the conductive wire.

With this configuration, the diameter of the rigid wire can be reduced, and thus the diameter of the external cover member can be reduced, which contributes to a reduction in the diameter of the wire harness.

In this wire harness, the first insulating coating is in contact with an inner circumferential face of the external cover member at a bent portion in which the rigid wire and the external cover member are bent.

With this configuration, the first insulating coating of the rigid wire is in contact with the inner circumferential face of the external cover member at the bent portion, and thus heat from the rigid wire can be directly transferred through this contact portion to the external cover member. Accordingly, the heat dissipation performance of the conductive wire can be improved.

In this wire harness, the external cover member is a metal pipe. With this configuration, the external cover member is a metal pipe, and thus heat from the rigid wire can be more efficiently transferred to the external cover member.

According to the present description, the diameters of a conductive wire and a wire harness can be reduced.

DETAILED DESCRIPTION OF THE PREFERRED EMBODIMENTS

Figure 1:
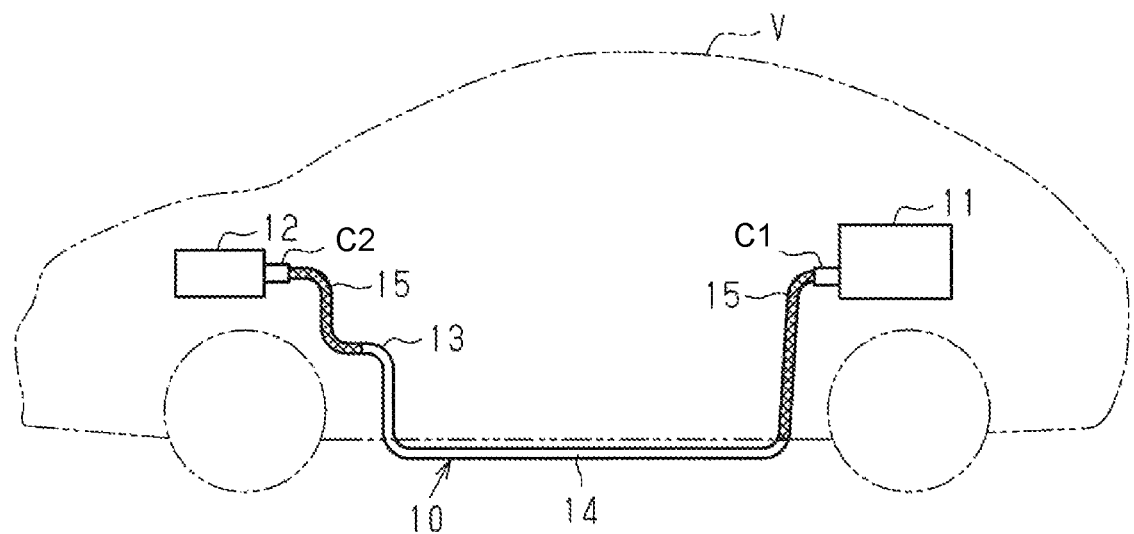
FIG. 1 is a schematic configuration view of a wire harness in an embodiment.

Hereinafter, an embodiment of a conductive wire and a wire harness will be described with reference to FIGS. 1 to 3. Note that portions of configurations may be shown in an exaggerated or simplified manner in the drawings in order to facilitate the description. The dimension ratios of portions may also differ from actual dimension ratios.

A vehicle V shown in FIG. 1 includes a high-voltage battery 11 and an inverter 12 that are connected to each other via a wire harness 10. In this embodiment, the inverter 12 is provided in a front portion of the vehicle V, and the high-voltage battery 11 is provided in a rear portion of the vehicle V. The high-voltage battery 11 is a battery capable of supplying a voltage of several hundred volts. Furthermore, the inverter 12 is connected to a motor for driving wheels (not shown) that serves as the power source for a vehicle to travel, and generates AC power from DC power from the high-voltage battery 11 and supplies the AC power to the motor.

The wire harness 10 includes a plurality of conductive wires 20 (see FIG. 2) that are electrically connected to the high-voltage battery 11, and an electromagnetic shield portion 13 that encloses the outer circumference of the conductive wires 20. In this embodiment, the number of conductive wires 20 provided is a plural (only one of them is shown in FIGS. 2 and 3). One end of each conductive wire 20 is connected via a connector C1 to the high-voltage battery 11, and the other end is connected via a connector C2 to the inverter 12.

The electromagnetic shield portion 13 is in the shape of an elongated tube as a whole. The middle in the length direction of the electromagnetic shield portion 13 is constituted by a metal pipe 14, and portions including both ends in the length direction of the electromagnetic shield portion 13, other than the portion constituted by the metal pipe 14, are constituted by braided members 15.

The metal pipe 14 is made of a metal material such as an iron-based or aluminum-based material. The metal pipe 14 is arranged routed under the floor of the vehicle, and is bent into a predetermined shape that corresponds to the configuration of the region under the floor. More specifically, the middle in the length direction of the metal pipe 14 substantially horizontally extends along the front-rear direction under the floor of the vehicle, and the rear end of the metal pipe 14 is introduced to the rear suspension side of the interior. The front end of the metal pipe 14 is bent upward and introduced to the engine room and extends toward the inverter 12. The metal pipe 14 collectively shields the plurality of conductive wires 20 that extend through the metal pipe 14, and protects the conductive wires 20 from flying rocks and the like.

The braided members 15 are tubular members obtained by braiding a plurality of metal element wires. The braided members 15 are respectively connected via connectors such as crimp rings (not shown) to both ends in the length direction of the metal pipe 14. Accordingly, the braided members 15 and the metal pipe 14 are electrically connected to each other. The braided members 15 collectively enclose the outer circumferences of portions of the plurality of conductive wires 20 projecting out of the ends of the metal pipe 14. Accordingly, the projecting portions of the plurality of conductive wires 20 are electromagnetically shielded by the braided members 15. The outer circumferences of braided members 15 are enclosed, for example, by an external cover member (not shown) such as a corrugated tube. Furthermore, the braided members 15 collectively enclose the outer circumference of later-described flexible wires 23 constituting a portion of the conductive wires 20.

Figure 2:
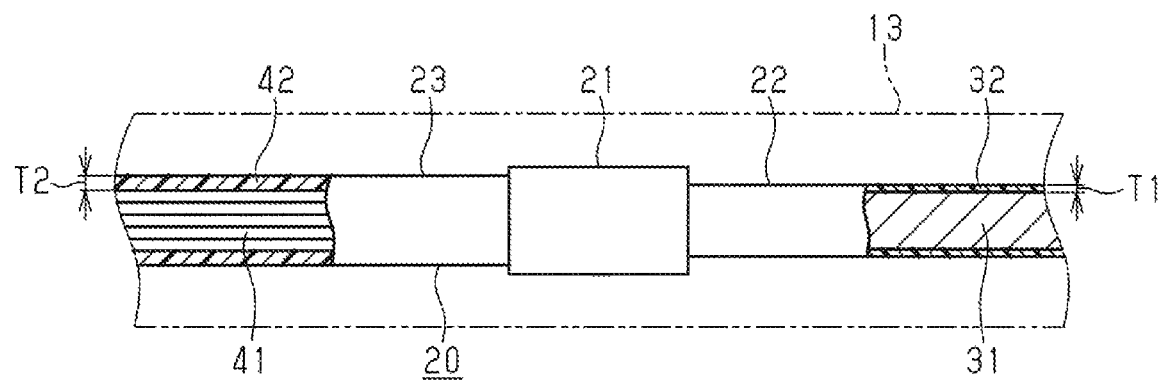
FIG. 2 is a schematic view showing a part of a conductive wire in this embodiment.

As shown in FIG. 2, each conductive wire 20 has a rigid wire 22 and a flexible wire 23 whose ends are connected to each other at a connecting portion 21. In this embodiment, flexible wires 23 are respectively connected to both ends of the rigid wire 22. Furthermore, the middle in the length direction of the conductive wire 20 is constituted by the rigid wire 22, and portions including both ends in the length direction of the conductive wire 20, other than the portion constituted by the rigid wire 22, are constituted by the flexible wires 23. Furthermore, the outer circumference of the rigid wire 22 is covered by the metal pipe 14, and the outer circumferences of the flexible wires 23 are covered by the braided members 15. The connecting portions 21 between the rigid wire 22 and the flexible wires 23 are positioned in the metal pipe 14 or in the braided members 15.

Each rigid wire 22 has a first core wire 31 and a first insulating coating 32 that covers the outer circumference of the first core wire 31. The first core wire 31 of this embodiment is constituted by a single-core wire with a solid internal structure. The first core wire 31 is made of, for example, aluminum or an aluminum alloy. The first insulating coating 32 may be constituted by, for example, a heat shrinkable tube made of a synthetic resin or the like, and the inner circumferential face of the first insulating coating 32 is in close contact with the outer circumferential face of the first core wire 31. The first insulating coating 32 has a substantially circular contour.

Each flexible wire 23 has a second core wire 41 that is superior to the first core wire 31 in terms of flexibility, and a second insulating coating 42 that covers the outer circumference of the second core wire 41 and is made of an insulating material such as a synthetic resin. The second core wire 41 of this embodiment is a twisted wire constituted by a plurality of conductive wires (copper wires, aluminum wires, etc.). The second insulating coating 42 can be formed, for example, through extrusion molding (extrusion coating) onto the second core wire 41, and is provided in close contact with the outer circumferential face of the second core wire 41. The second insulating coating 42 has a substantially circular contour. Note that a wall thickness T1 in the radial direction of the first insulating coating 32 of the rigid wire 22 is set to be smaller than a wall thickness T2 in the radial direction of the second insulating coating 42 of the flexible wire 23.

An end of the second core wire 41 exposed from the second insulating coating 42 is connected at the connecting portion 21 to an end of the first core wire 31 exposed from the first insulating coating 32. Accordingly, the second core wire 41 and the first core wire 31 are electrically connected to each other.

Figure 3:
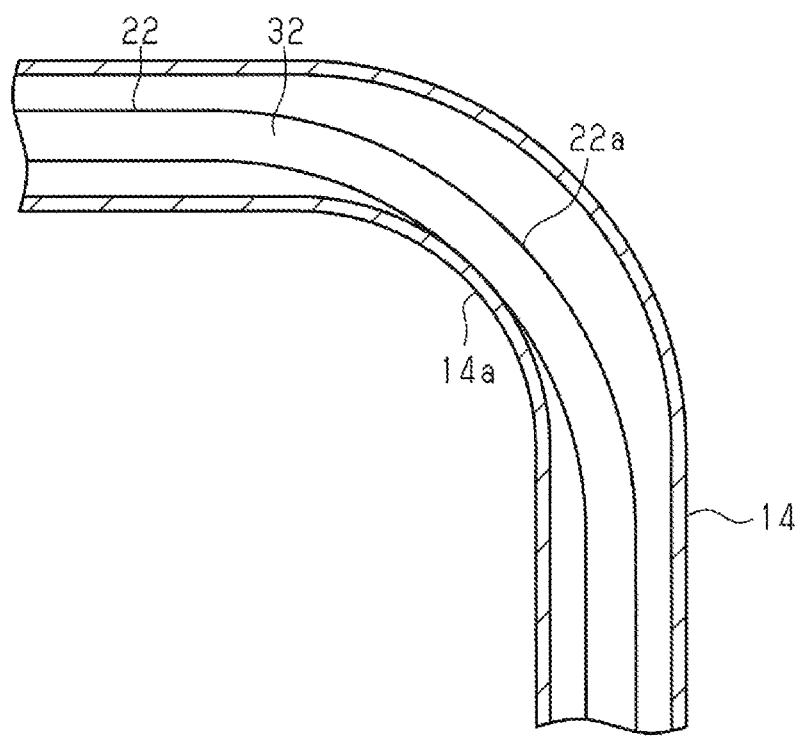
FIG. 3 is a schematic view showing a part of a wire harness in this embodiment.

FIG. 3 shows the internal configuration of a bent portion 14a of the metal pipe 14 bent so as to conform to the configuration under the floor of the vehicle V. In the drawing, the bent portion 14a of the metal pipe 14 is bent at a right angle, but this is merely an example, and the bending angle of the bent portion 14a also may be an angle other than a right angle.

As shown in FIG. 3, a portion of the rigid wire 22 that extends through the bent portion 14a of the metal pipe 14 is a bent portion 22a bent substantially in a similar manner to the bent portion 14a of the metal pipe 14. In this embodiment, the curvature of the bent portion 22a of the rigid wire 22 is set to be smaller than the curvature of the bent portion 14a of the metal pipe 14. The outer circumferential face of the first insulating coating 32 at the bent portion 22a of the rigid wire 22 is in contact with the inner circumferential face on the inner side of the bend of the bent portion 14a of the metal pipe 14. It is preferable that such a contact structure with the bent portion 14a of the metal pipe 14 is applied to each of the plurality of rigid wires 22 that extend through the metal pipe 14.

Next, actions of this embodiment will be described.

Each conductive wire 20 includes a rigid wire 22 whose diameter can be easily reduced, and flexible wires 23 that are excellent in terms of flexibility. Accordingly, in the conductive wire 20, the portion that corresponds to the rigid wire 22 has a small diameter, and portions that are to be arranged near electrical devices (the high-voltage battery 11 and the inverter 12) or the like where it is difficult for wires to be arranged are constituted by the flexible wires 23 so that the vehicle mountability is improved.

Next, effects of this embodiment will be described.

(1) In each conductive wire 20 of the wire harness 10, the wall thickness T1 in the radial direction of the first insulating coating 32 of the rigid wire 22 is set to be smaller than the wall thickness T2 in the radial direction of the second insulating coating 42 of the flexible wire 23, and thus, the diameter of the rigid wire 22 can be reduced. If the diameter of the rigid wire 22 is reduced, the diameter of the metal pipe 14 covering the outer circumference of the rigid wire 22 can be reduced, which contributes to a reduction in the diameter of the wire harness 10.

(2) The first core wire 31 is a single-core wire having a solid structure, and thus the diameter of the rigid wire 22 can be further reduced.

(3) The first insulating coating 32 of the rigid wire 22 is in contact with the inner circumferential face of the metal pipe 14 at the bent portions 14a and 22a at which the metal pipe 14 and the rigid wire 22 are bent, and thus heat from the rigid wire 22 can be directly transferred through this contact portion to the metal pipe 14. Accordingly, the heat dissipation performance of the conductive wire 20 can be improved.

(4) The external cover member covering the outer circumference of the rigid wire 22 is the metal pipe 14, and thus heat from the rigid wire 22 can be more efficiently transferred to the external cover member (the metal pipe 14), and the heat dissipation performance of the conductive wire 20 can be further improved.

(5) The second core wire 41 is constituted by a twisted wire, and thus it is possible to preferably configure a flexible wire 23 that is excellent in terms of flexibility.

It is also possible that the foregoing embodiment is modified as follows.

In the foregoing embodiment, the curvature of the bent portion 22*a* of the rigid wire 22 is set to be smaller than the curvature of the bent portion 14*a* of the metal pipe 14, so that the rigid wire 22 comes into contact with the bent portion 14*a* of the metal pipe 14 on the inner side of the bend. However, there is no limitation to this, and the curvature of the bent portion 22*a* of the rigid wire 22 also may be set to be larger than the curvature of the bent portion 14*a* of the metal pipe 14 so that the rigid wire 22 comes into contact with the bent portion 14*a* of the metal pipe 14 on the outer side of the bend.

The materials of which the first core wire 31 and the second core wire 41 are made in the foregoing embodiment are merely an example, and may be changed as appropriate as long as they are conductive.

Furthermore, the materials of which the first and second insulating coatings 32 and 42 are made in the foregoing embodiment are merely an example, and may be changed as appropriate as long as they ensure electrical insulating properties.

In the foregoing embodiment, the first core wire 31 of the rigid wire 22 is a single-core wire, but this is merely an example, and the shape of the first core wire 31 may be changed as appropriate to a shape other than a solid cylinder. For example, the first core wire 31 may be changed to a conductive member in the shape of a hollow pipe.

In the foregoing embodiment, the metal pipe 14 is used as an external cover member covering the outer circumference of the rigid wire 22, but, for example, a corrugated tube made of a synthetic resin or the like also may be used instead of the metal pipe 14. In this case, it is preferable to provide, for example, the inner circumferential side of the corrugated tube with a tubular braided member for electromagnetic shielding to cover the rigid wire 22.

In the foregoing embodiment, the second core wire 41 of the flexible wire 23 is constituted by a twisted wire, but also may be, for example, a braided member obtained by braiding conductive wires instead of a twisted wire.

In the foregoing embodiment, the high-voltage battery 11 and the inverter 12 are used as electrical devices that are connected to each other via the conductive wires 20, but there is no limitation to this. For example, the conductive wires 20 may be used as electric wires for connecting the inverter 12 and a motor for driving wheels. That is to say, the conductive wires 20 may be used as any wire for electrically connecting electrical devices that are mounted in a vehicle.

The foregoing embodiment and the modified examples may be combined as appropriate.

LIST OF REFERENCE NUMERALS

10: Wire Harness
11: High-Voltage Battery (Electrical Device)
12: Inverter (Electrical Device)
14: Metal Pipe (External Cover Member)
20: Conductive Wire
22: Rigid Wire
23: Flexible Wire
31: First Core Wire
32: First Insulating Coating
41: Second Core Wire
42: Second Insulating Coating
14*a*, 22*a*: Bent Portion
T1, T2: Wall Thickness
V: Vehicle

What is claimed is:

1. A conductive wire configured to be arranged in a vehicle and electrically connect electrical devices, comprising:
    a rigid wire having a first core wire having a first diameter, and a first insulating coating that covers an outer circumference of the first core wire; and
    a flexible wire having a second core wire having a second diameter, the second diameter being uniform, wherein the second core wire is superior to the first core wire in terms of flexibility and is connected to an end of the first core wire, and a second insulating coating that covers an outer circumference of the second core wire,
    wherein a wall thickness in a radial direction of the first insulating coating is smaller than a wall thickness in a radial direction of the second insulating coating, and wherein the second diameter is larger than the first diameter.

2. The conductive wire according to claim 1, wherein the first core wire is a single-core wire.

3. A conductive wire configured to be arranged in a vehicle and electrically connect a plurality of electrical devices, the conductive wire comprising:
    a rigid wire having a first core wire, and a first insulating coating that covers an outer circumference of the first core wire; and
    a flexible wire having a second core wire having a uniform diameter, wherein the second core wire is more flexible than the first core wire and is connected to an end of the first core wire, and a second insulating coating that covers an outer circumference of the second core wire,
    wherein a wall thickness in a radial direction of the first insulating coating is smaller than a wall thickness in a radial direction of the second insulating coating, and wherein a diameter of the rigid wire is smaller than a diameter of the flexible wire.

4. A wire harness configured to be arranged in a vehicle and electrically connect electrical devices, the wire harness comprising:
    a conductive wire; and
    a metal pipe external cover having a bent portion, the conductive wire having a rigid wire and a flexible wire,
    the rigid wire having a single-core wire and a first insulating coating that covers an outer circumference of the single-core wire, the first insulating coating having a first wall thickness in a radial direction of the first insulating coating,
    the flexible wire having a twisted core wire constituted by a plurality of conductive wires and a second insulating coating that covers an outer circumference of the twisted core wire, the second insulating coating having a second wall thickness in a radial direction of the second insulating coating, wherein the flexible wire is superior to the rigid wire in terms of flexibility, and the twisted core wire is connected to an end of the single-core wire,
    wherein the first wall thickness of the first insulating coating is smaller than the second wall thickness of the second insulating coating, and wherein the first insulating coating covering the single-core wire of the rigid wire is in contact with an inner circumferential face of the bent portion of the metal pipe external cover.

5. The wire harness according to claim 4, wherein the metal pipe external cover is a rigid member configured to retain a shape.

\* \* \* \* \*